United States Patent [19]

Morgan et al.

[11] Patent Number: 5,199,108
[45] Date of Patent: Mar. 30, 1993

[54] SHORT RANGE RADIO INFORMATION SYSTEM

[75] Inventors: Richard E. Morgan, Richardson; Nolan D. Self, Duncanville, both of Tex.

[73] Assignee: Electronic Communications, Inc., Garland, Tex.

[21] Appl. No.: 292,494

[22] Filed: Dec. 30, 1988

[51] Int. Cl.$^5$ ............................................. H04B 7/14
[52] U.S. Cl. ......................................... 455/18; 455/99; 455/121; 340/905
[58] Field of Search .................. 455/3, 6, 11, 18, 49, 455/51, 53, 54, 57, 66, 95, 100, 41, 127, 18, 128, 99, 120, 121, 351, 129, 193; 340/905; 381/78

[56] References Cited
U.S. PATENT DOCUMENTS

| | | |
|---|---|---|
| 2,255,055 | 3/1939 | Halstead .............................. 340/905 |
| 3,018,373 | 1/1962 | Nygaard .............................. 455/193 |
| 3,660,762 | 5/1972 | Smith .................................... 455/41 |
| 4,541,119 | 9/1985 | Cooper et al. ........................ 455/57 |
| 4,606,073 | 8/1986 | Moore ................................. 455/100 |
| 4,799,189 | 1/1989 | Grover ................................. 455/18 |

Primary Examiner—Curtis Kuntz
Attorney, Agent, or Firm—Kenneth C. Hill

[57] ABSTRACT

A radio information system operating at low power transmits in the AM broadcast band. A message to be broadcast is digitized and stored in a random access memory. It is retrieved from the memory, converted to analog form, and used to modulate a carrier signal. The message is continuously repeated, allowing nearby persons with AM radio sets to receive the message. In order to extend the useful range of the information system, an impedance matching circuit with a high-Q inductor is located between the antenna and the output circuitry of the transmitter.

5 Claims, 3 Drawing Sheets

SHORT RANGE RADIO INFORMATION SYSTEM

BACKGROUND OF THE INVENTION

1. Field of the Invention

The present invention relates generally to broadcast information systems, and more specifically to a low power broadcast system for transmitting information to passerby.

2. Description of the Prior Art

As is well known in marketing and related fields, it is often desirable to communicate selected information to people traveling in automobiles. Perhaps the most ubiquitous form of communication is the roadside sign. Roadside signs have the advantage that they are, if properly designed and placed, easily read by anyone driving by.

They have several drawbacks, however, in that the amount of information which can be placed on a sign is limited, the information is not easily changed, and drivers must take their eyes off the road in order to read them. A system which communicated information to automobile drivers audibly would have several significant advantages over the use of road side signs.

The United States Federal Communications Commission (FCC) has promulgated regulations which allow the public to transmit radio signals in the AM broadcast band, which ranges from approximately 500 KHz to 1,600 KHz. Certain restrictions apply, such as limitation of broadcast power, and transmitting antenna length. The antenna is limited to 3 meters in length, which is very short for the wavelengths involved. Also, the total DC power supplied to the output stage transistor cannot exceed 100 milliwatts. Within the restrictions of the regulations, anyone is free to broadcast within this band.

In order to take advantage of these FCC regulations, several manufacturers have built low power transmitters in compliance therewith. These transmitters incorporate an endless loop cassette tape which contains the message to be broadcast. The endless loop tapes typically have a playback length of one to two minutes. The tapes are played continuously, so that the broadcast message is repeated with a period equal to the playback time of the endless loop tape.

Such prior art systems have a number of serious drawbacks which have precluded their widespread acceptance. Such systems are subject to mechanical breakdown of the cassette tape drive system, which usually operates continuously. The tape itself usually has to be replaced at least monthly. In addition, the range of prior art systems is quite short, thereby limiting their usefulness. An additional factor precluding acceptance has been the difficulty of using endless loop tapes for continuously repeating messages. Each tape has a fixed playback length, which requires that messages be exactly that length. Shorter messages leave a period of dead time in transmission until the message repeats. If, for example, a message is 70 seconds in length, and only 60 and 90 second endless loop tapes are available, the message must either be shortened to fit on the 60 second tape, or 20 seconds of dead air time will occur between each repetition of the messages when the 90 second tape is used. As is well known in the broadcasting industry, dead air time is extremely undesirable.

It would be desirable for a low power broadcast information system to provide increased reliability and transmitting range. It would further be desirable for such a system to be easy to use, and to allow the repetitive broadcast of messages of any length without dead air time between repetitions of the message.

SUMMARY OF THE INVENTION

It is therefore an object of the present invention to provide a low power broadcast system which is relatively immune to mechanical failure.

It is a further object of the present invention to provide a low power broadcast system which provides increased range for a given output stage power.

It is another object of the present invention to provide a low power broadcast system which continuously repeats a prerecorded message of arbitrary length without dead air time.

Therefore, in accordance with the present invention, a low power radio broadcast station includes a voice digitizer and a random access memory. The voice digitizer includes analog to digital circuitry for digitizing analog voice input and storing it into the random access memory. Also included is digital to analog circuitry for converting voice signals stored in the random access memory back into analog form. During playback, a message stored in the random access memory is used to modulate a radio carrier wave. The radio transmitter is matched to its antenna through high-Q impedance matching circuitry.

BRIEF DESCRIPTION OF THE DRAWINGS

The novel features which characterize the present invention are defined by the appended claims. The foregoing and other objects and advantages of the present invention will hereinafter appear, and for purposes of illustration, but not of limitation, several preferred embodiments are shown in the accompanying drawings.

DETAILED DESCRIPTION OF THE INVENTION

Figure 1:
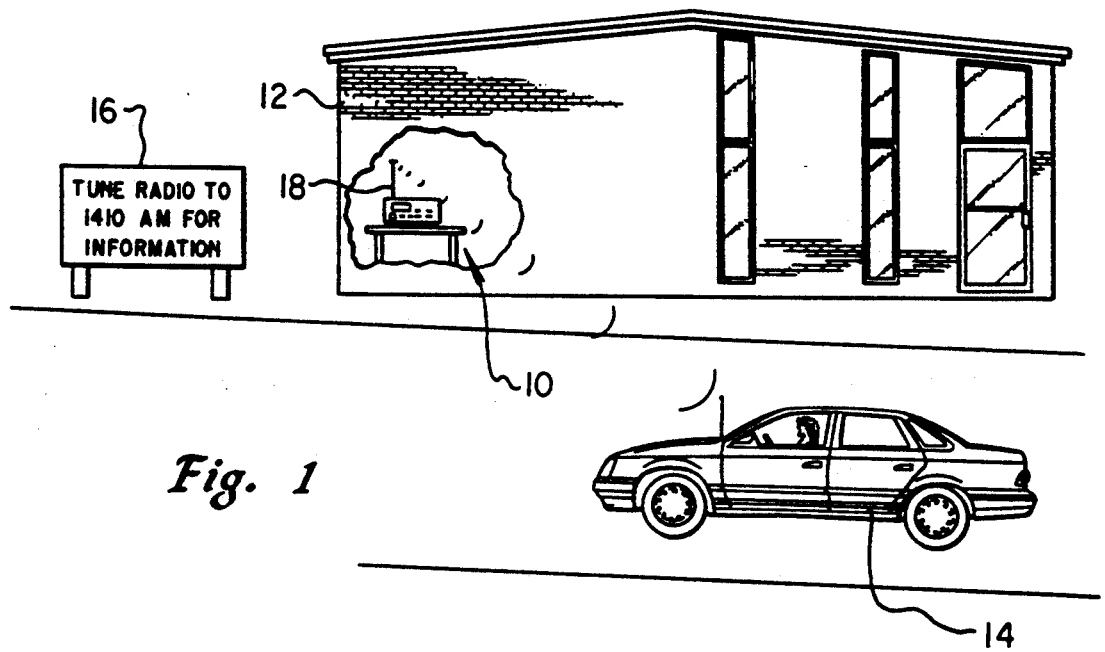
FIG. 1 illustrates a typical application utilizing a short range radio information system in accordance with the present invention.

FIG. 1 illustrates a typical application for a short range radio information system. A broadcast station 10 is located at some convenient location inside of a building 12. The broadcast station 10 broadcasts continuously, and the broadcasts are received by passing automobiles 14. The message is broadcast in the AM broadcast band, which can be received by nearly every car radio.

A sign 16 near the building 12 indicates the station to which the radio in the car 14 must be tuned in order to receive the broadcast. So long as the car 14 is within approximately 1,000 feet of the transmitter 10, it will be able to receive the broadcast signal. The transmitting frequency of the transmitter 10 is selected to be a frequency which does not interfere with near by AM broadcast channels, or with other nearby low power transmitting systems.

The broadcast station 10 has a telescoping antenna 18 which is extended vertically for best broadcast coverage. The antenna 18 is preferably as long as possible, but is currently limited by FCC regulations to a maximum length of three meters. This is quite short compared to the wave length of the AM broadcast band, which requires the use of a tuning circuit attached to the antenna 18 as will be described below.

Figure 2:
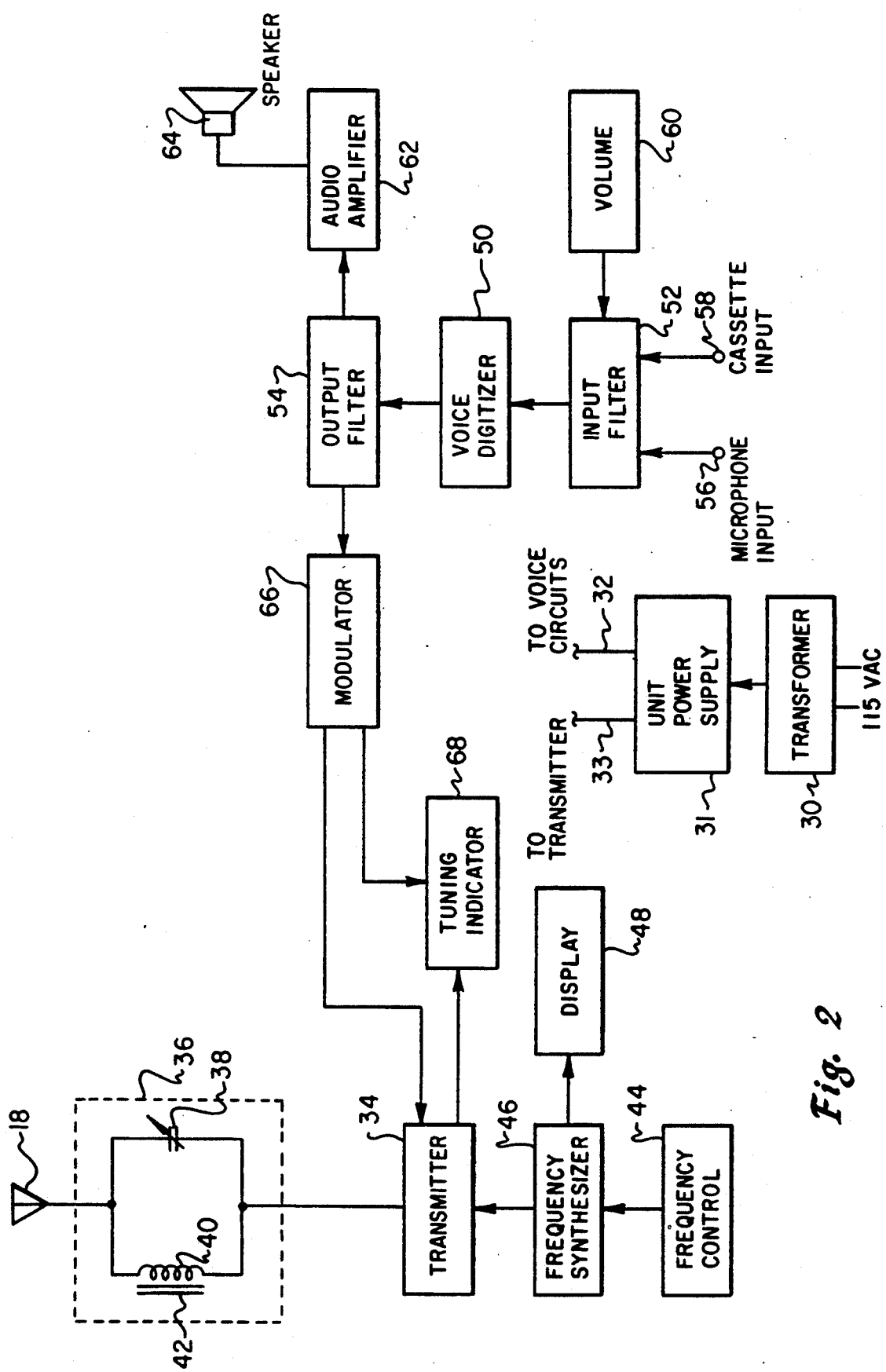
FIG. 2 is a block diagram of a broadcast station according to the present invention.

FIG. 2 is a block diagram of a preferred broadcast station 10 according to the present invention. Power for the broadcast station 10 is supplied through a transformer 30 which is connected to a standard 115 volt AC outlet. The transformer supplies current to a unit power supply 31, which supplies low voltage 32 to voice and other digital circuits in the broadcast station 10, and a higher voltage 33 to a transmitter 34.

The transmitter 34 is connected to the antenna 18 through an impedance matching tank circuit 36. This tank circuit 36 has a variable capacitor 38 in parallel with an inductor 40. As is known in the art, such a circuit has a resonance frequency as set forth in equation 1:

$$f_0 = \frac{1}{2\pi \sqrt{LC}} \quad (1)$$

Varying the value of the capacitor 38 allows the impedance of the antenna 18 to be matched to that of the transmitter 34. As is known in the art, this provides the most efficient transfer of power from the transmitter 34 to the antenna 18.

By FCC regulation, transmitters for use by the public in the AM broadcast band are limited to a very low power. The maximum power is defined to be 100 milliwatts DC power supplied to the final stage of the transmitter 34. The maximum power radiated from the antenna 18 will be substantially less than this amount. The maximum useful range of the broadcast station 10 is limited by the amount of power radiated from the antenna 18.

As known in the art, an important factor in detrmining antenna efficiency is the length of the antenna compared to the wavelength of the broadcast signal. A very short antenna, in terms of the wavelength, is very inefficient. By regulation, the antenna for low power broadcast stations is limited to 3 meters in length. In contrast, the wavelength for a 1 MHz transmission, the center of the AM broadcast band, is approximately 300 meters. The 3 meter antenna is very inefficient, and presents a high impedance to the output circuitry.

Since the tank circuit 36 and the antenna 18 present series impedances to the transmitter 34, the power radiated by the antenna 18 depends on the relative impedances of the antenna 18 and the inductor 40. Inductors have an equivalent parallel resistance which dissipates power. This decreases the power available to be radiated by the antenna 18. In the preferred embodiment, the inductor 40 is formed on a ferrite rod 42, which increases the equivalent parallel resistance.

The value of the equivalent parallel resistance of an inductor is reflected in an indicator called the Q-value of the inductor. High-Q inductors have a high equivalent parallel resistance. Use of the ferrite rod 42 increases the Q of the inductor 40, which in turn decreases the power losses in the inductor 40. Increasing the Q of the inductor 40 therefore decreases the losses in the tank circuit 36 and increases the power of the radiated signal. Use of the ferrite rod 42 can, by increasing the radiated power, increase the useful range of the broadcast station 10 from approximately 200 feet to approximately 1,000 feet without requiring any other changes in the design of the broadcast station 10.

The transmission frequency of the broadcast station 10 is set by a frequency control 44. The frequency control 44 can be a simple analog tuner, but is preferably a digital selector. Channel selection may be made by driving a digital counter up or down using up and down channel selection switches, or by any other method as known in the art.

The output from the frequency control 44 is connected to a frequency synthesizer 46, which generates a carrier wave for the output signal. A display 48 is connected to the frequency synthesizer 46, and indicates the carrier frequency. The display 48 is preferably a digital display.

The message to be transmitted is stored in a voice digitizer 50. The voice digitizer 50 accepts analog audio signals from an input filter 52, and generates analog audio signals which are sent to an output filter 54. Details of the voice digitizer 50 are described in connection with FIG. 3.

The input filter 52 has a microphone input 56 and a cassette input 58. These inputs are impedance matched for a microphone and cassette player output, respectively. The input filter mixes the two inputs, if there are audio signals present on both inputs at the same time, and sends the summed output to the voice digitizer. The input filter 52 includes a volume control 60 which is used to set the volume level of messages when they are recorded.

The output filter 54 is connected to an audio amplifier 62, which is in turn connected to a speaker 64. A switch (not shown) connected to the output filter determines whether output from the voice digitizer 50 is connected to the audio amplifier 62 or a modulator 66. When the output is directed to the audio amplifier 62, the broadcast station 10 is operating in a message playback mode, and the message stored in the voice synthesizer 50 is amplified and played back through the speaker 64. This allows a station operator to verify the content of the stored messages.

When the broadcast station 10 is operating in a transmit mode, the audio output is sent from the output filter 54 to the modulator 66. The modulator 66 uses the received audio signal to control the power supply voltage to the output stage of the transmitter 34. The supply voltage to the transmitter 34 varies in step with the audio signal received from the output filter 54. This varies the amplitude of the carrier, resulting in amplitude modulation, as known in the art.

A tuning indicator 68 is connected to the modulator 66 and the transmitter 34. By measuring the reflected power from the antenna 18, the tuning indicator 68 indicates whether the tank circuit 36 is properly adjusted for the carrier frequency currently selected by the frequency control 44. Once the frequency has been set in the frequency control 44, the variable capacitor 38 is adjusted until the tuning indicator 68 indicates that the tank circuit 36 is properly tuned. The tuning indicator is preferably a series of LED's which are lighted in sequence to indicate signal level, but may be other alternatives known in the art such as analog meters.

The tuning indicator 68 is also connected to the modulator 66, and used to indicate the degree of modulation of the carrier. Since this is proportional to the amplitude of the audio signal, the RMS value of the audio signal is used to drive the indicator 68. The indicator 68 is connected to the modulator 66 when the system is in message playback mode, and to the transmitter 34 when the system is operating in the transmit mode.

Figure 3:
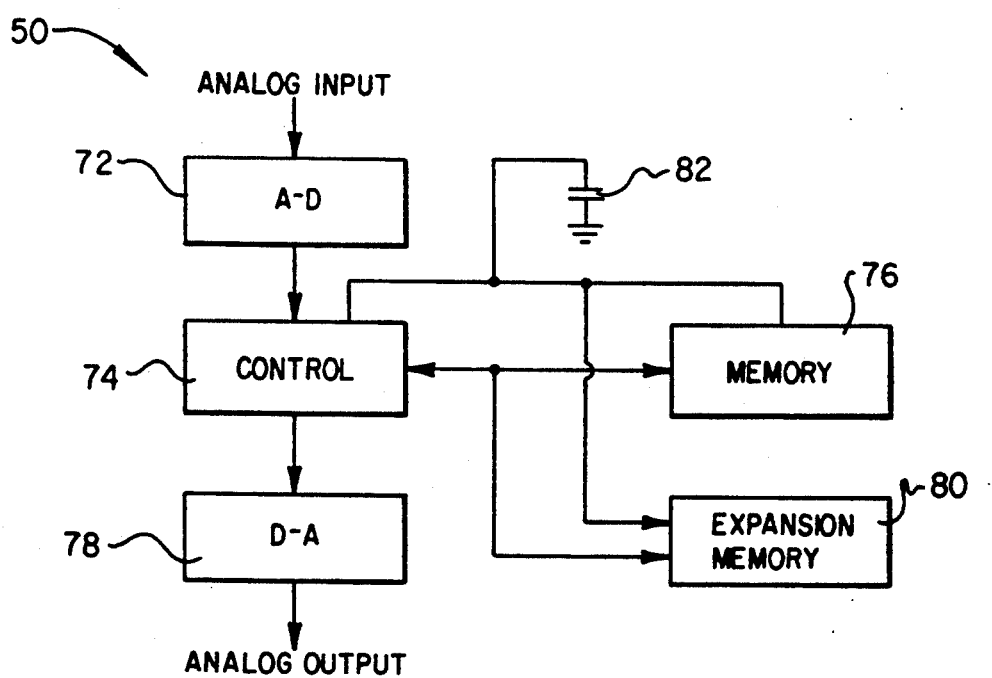
FIG. 3 is a block diagram of a preferred voice digitizer.

FIG. 3 is a block diagram showing details of the voice digitizer 50. Analog input is provided to an analog to digital converter 72, which samples the input data periodically and converts it to digital form. The digital data is then transmitted to a control circuit 74 which stores the digital data into a memory 76 when a message is being recorded.

During playback, the control circuit 74 reads the data from the memory 76, and sends it to a digital to analog converter 78. Analog output from the D to A converter 78 is connected to the rest of the broadcast station 10 circuitry as described in connection with FIG. 2.

The conversion and control functions represented by blocks 72, 74 and 78 can all be performed in a single integrated circuit chip currently available on the market, such as the Oki 6258. In the preferred embodiment, the stored digital data is eight bits wide. The memory 76 preferably uses six 41464 memory chips arranged as a 96K×8 bit memory. With a clock rate of 4.096 MHz clock supplied to a 6258 integrated circuit chip, the A to D converter 72 within the part samples the analog input at 2 KHz, and the 96K memory 76 provides 45 seconds of message time.

Longer messages can be stored by increasing the available system memory with one or more memory expansion units 80. In the preferred embodiment, up to four expansion units can be added to the system, with each unit containing 64K×8 bits of memory. This allows each expansion unit to provide an additional 30 seconds of message time, for a total of two minutes and 45 seconds maximum message length.

In order to preserve the contents of the memory 76 and the expansion memory 80 in case of a power failure, a battery 82 is connected to the memories 76, 80 and the controller 74. This battery 82 is preferably a NiCad battery such as known in the art.

As is known in the art, electronic devices which generate radiofrequency (RF) signals must be well grounded and filtered to avoid putting RF noise back into the power supply lines. The FCC regulations which authorize low power transmissions on the AM broadcast band also specify maximum allowable levels of RF noise to the power supply lines when the broadcast station 10 is normally grounded, and when the ground connection has been broken for some reason. Since it is very difficult to avoid generating RF noise in the power supply when the ground connection is broken, the power supply 31 has a circuit which detects this condition and prevents operation of the broadcast station 10 when the connection is broken.

Figure 4:
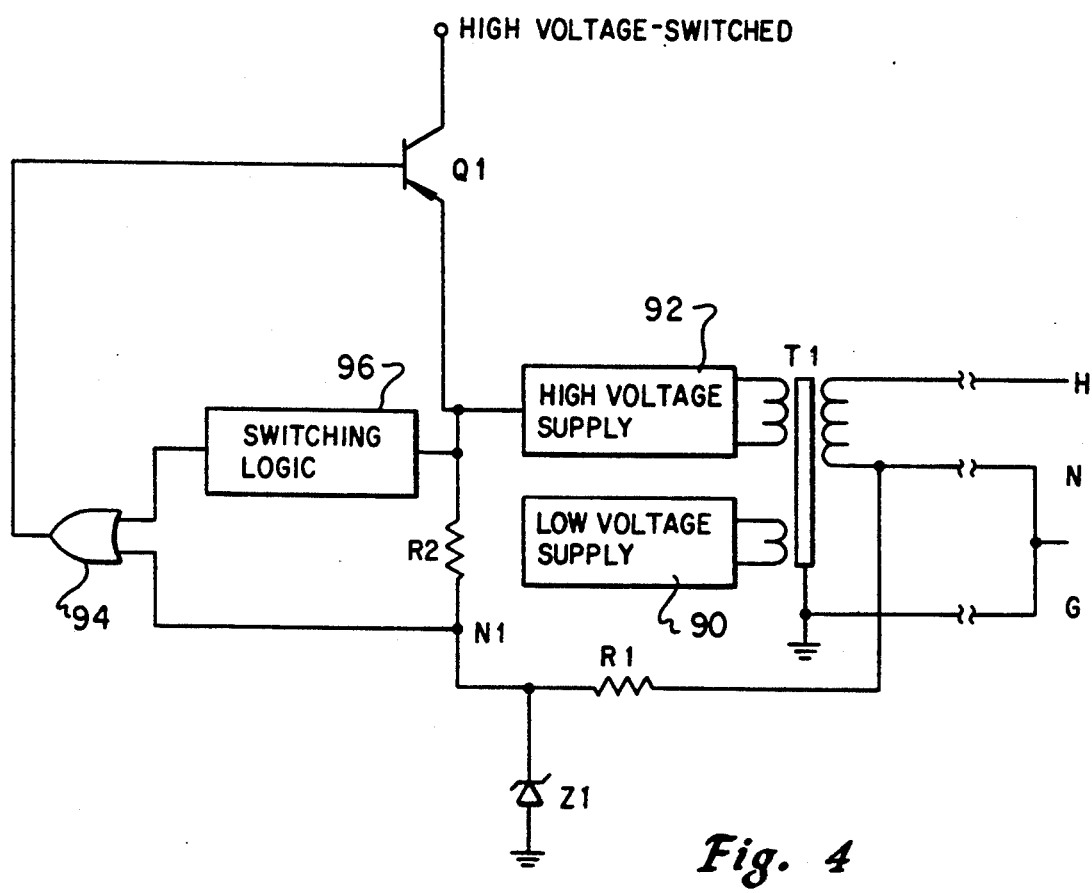
FIG. 4 is a circuit diagram of a ground line connection sensor.

FIG. 4 shows a preferred circuit for detecting a break in the ground line connection. The hot, neutral, and ground lines in a normal AC power supply system are labelled H, N, and G respectively. The G and N lines are connected together at the breaker box of the building 12. Voltage is stepped down through transformer T1, and filtered and regulated in separate low voltage supply 90 and high voltage supply 92. Resistor R1 and zener diode Z1 prevent damage from power line spikes and are connected to the neutral line and to an input of logic OR gate 94. This input is connected through resistor R2 to the high voltage supply 92.

The output of the OR gate 94 drives the base of switching transistor Q1. If the output of OR gate 94 is high, Q1 turns off. If the output is low, Q1 is on, and the high voltage supply 92 is connected to the switched high voltage terminal. The switched high voltage is used to power the RF stages of the station 10.

R1 has a relatively low resistance, such as 100 ohms. R2 is relatively high, such as 47K ohms. If the N and G lines are properly tied together, the voltage at node N1 will be 0 volts. If, for any reason, there is a break between N and G, the voltage at N1 will be high, and the output of gate 94 will be high. This situation causes Q1 to be turned off. In this manner, no power is supplied to any RF stages of the station 10 when no proper ground exists. This prevents RF noise being returned to the power supply when the station 10 is not properly grounded.

Other switching logic 96 can be used to prevent power being supplied to the RF stages when desired. Whenever it is desired to disconnect the RF stages, it is necessary only to generate a high voltage to gate 94, which then turn Q1 off. The other switching logic 96 can be used, for example, to disconnect power to the RF stages when a message is being recorded or played back to check its content and quality, or when the transmitting frequency is being changed.

Operation of the broadcast station 10 is straight forward. A transmission carrier frequency is selected by scanning any AM radio through its spectrum until a free band is found. The frequency control 44 is then set to this frequency, as indicated by the display 48. The message to be then transmitted is then input into the voice digitizer 50 by simply speaking into a microphone connected to the microphone input 56. Once the message is stored, it can be played back through the speaker 64 to verify the message content. The controller 74 operates so that the length of the message stored in the memory 76, 80 at record time limits the length of the message played back. That is, the playback period of the stored message is equal to the length of the message regardless of the amount of memory in the system. A switch (not shown) is connected to the voice digitizer to indicate when a message is actually being recorded, and the signal from this switch used to determine the length of the recorded message.

Once the contents of the stored message have been verified, the broadcast station 10 is switched into transmit mode, and the antenna tuning adjusted if necessary as described above. At this point, the user is "on the air", repeatedly transmitting his stored message for as long as desired.

The transmitted message can be used to inform customers about sales or operating hours of a business. The system can be used at drive-in banks, movie theaters, or schools to inform interested parties of important events. It can be used to replace roadside signs, and is cheaper and more versatile than such signs.

Although a preferred embodiment has been described in detail, it should be understood that various substitutions, alterations and modifications may become apparent to those skilled in the art. These changes may be made without departing from the spirit and scope of the invention as defined by the appended claims.

What is claimed is:

1. A low power AM band broadcast station, comprising:
    an antenna;
    a transmitter;
    a tuning circuit coupled to said antenna and to said transmitter, wherein said tuning circuit has an inductor and a capacitor in parallel, wherein said tuning circuit matches the impedance of the transmitter with that of the antenna, and wherein the inductor is formed on a high magnetic permeability element to form a high-Q inductor;

means coupled to said transmitter for controlling the frequency of a transmitted carrier signal;

a modulator coupled to said transmitter for modulating the carrier signal in response to an applied electrical signal representing audio information;

means for accepting an audio signal and converting it to a corresponding electrical signal;

an A to D converter coupled to said accepting means for converting the electrical signal into digital form;

a memory for storing the digital form of the electrical signal;

a D to A converter coupled to said memory and to said modulator for converting the digital form to a second electrical signal and applying it to said modulator; and control means coupled to said memory and to said D to A converter for repeatedly reading the digital form of the electrical signal from said memory.

2. The system of claim 1, wherein the high magnetic permeability material comprises a ferrite rod.

3. The system of claim 1, wherein the capacitor is a variable capacitor, whereby the tuning circuit is adjustable.

4. The system of claim 1, further comprising:
a sensor coupled to a power supply for sensing when a ground line is not properly connected; and
a switch coupled to said sensor, said transmitter, and said frequency controlling means for disconnecting all radio frequency circuits from the power supply when the ground line is not properly connected.

5. The system of claim 4, wherein said sensor comprises:
a voltage tap connected to an input power transformer, such transformer having hot and neutral input lines on a primary coil, wherein said tap is connected to the neutral primary coil input line;
a passive electronic circuit connected to said tap for generating a voltage signal representative of any voltage differential between the tap and ground; and
a driver connected to said switch and to said passive electronic circuit for turning said switch off when a voltage signal is present between said tap and ground.

* * * * *